United States Patent
Jacyno

[15] 3,665,228
[45] May 23, 1972

[54] MODULAR DESIGN-DOUBLE INSULATED FIELD

[72] Inventor: Anthony Jacyno, Aurora, Ill.
[73] Assignee: G. W. Murphy Industries, Inc., Houston, Tex.
[22] Filed: May 15, 1970
[21] Appl. No.: 37,810

[52] U.S. Cl..................................................310/47, 310/50
[51] Int. Cl. ..........................................................H02k 7/14
[58] Field of Search...............................................310/47, 50

[56] References Cited

UNITED STATES PATENTS

| | | | |
|---|---|---|---|
| 3,119,942 | 1/1964 | Luther | 310/50 X |
| 3,283,185 | 11/1966 | Somers et al. | 310/47 |
| 3,344,291 | 9/1967 | Pratt | 310/50 |
| 3,432,703 | 3/1969 | Sheps et al. | 310/50 |
| 3,440,465 | 4/1969 | Pratt et al. | 310/50 X |
| 3,462,623 | 8/1969 | Batson et al. | 310/50 |
| 3,476,960 | 11/1969 | Rees | 310/50 |
| 3,518,465 | 6/1970 | Jepson et al. | 310/50 X |

Primary Examiner—L. T. Hix
Assistant Examiner—Mark O. Budd
Attorney—Hofgren, Wegner, Allen, Stellman & McCord

[57] ABSTRACT

In a power tool, an electric motor is mounted on an electrically conductive frame by an electrically insulating shield member which directly insulates the motor from the frame and also shields the motor field magnets against spark-gap conduction of electricity to the frame, preventing possible shock to the user.

7 Claims, 6 Drawing Figures

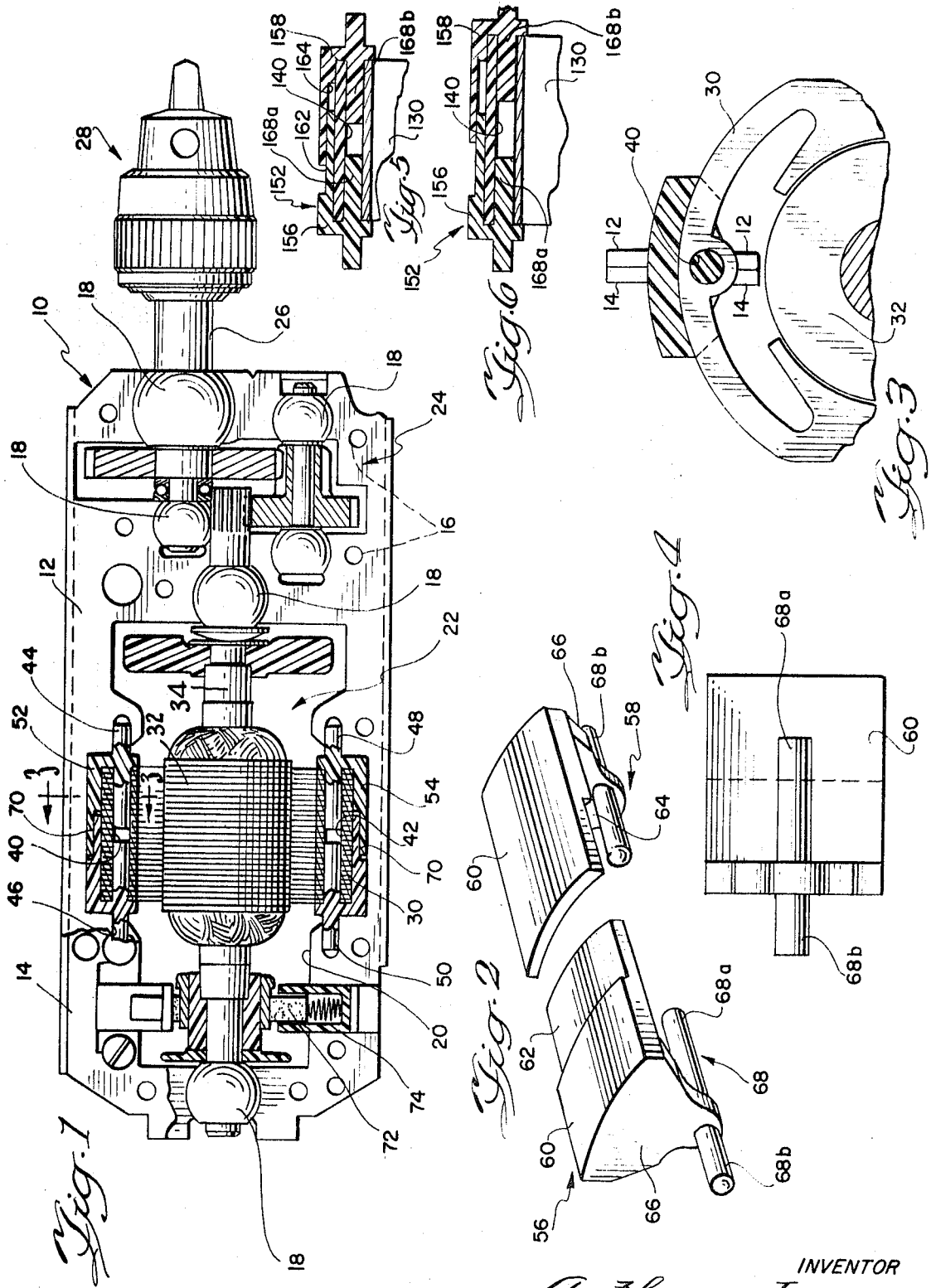

MODULAR DESIGN-DOUBLE INSULATED FIELD

BACKGROUND OF THE INVENTION

1. Field of the Invention

This invention relates to systems for mounting electric motors in power tools and more particularly relates to such mounting systems which prevent conduction of electricity from the motor to the power tool frame.

2. Brief Description of the Prior Art

A variety of systems have previously been provided for mounting motors in power tools and especially in portable or hand tools. Such mounting systems usually secure the motor directly to a frame. The frame can be an integral part of the casing or can be a separate member which is secured to the casing. The casings are often of electrically conductive metal although plastic casings are becoming more and more popular. Some casings are part plastic, e.g., the motor containing portion, and part metal, e.g., the handle and trigger portion. However, regardless of what type of material is used, where the frame which mounts the motor is electrically conductive, there is danger of shock to the user from current conducted from the motor to the frame, for example as may occur from a faulty insulation or a failure in insulation on the wire in the motor field windings during use of the device.

SUMMARY OF THE INVENTION

This invention is an improvement in devices driven by electric motors, and especially in portable tools such as drills, saws, hedgers, etc. The present invention is useful in any device having a frame made of or containing electrically conductive material. It is especially useful in those devices in which the motor is mounted on a motor mounting plate or an assembly of motor mounting plates, although it can be used in devices using other motor mounting systems which may or may not be integral with the tool casing. Briefly, the invention provides an insulating shield system for mounting the motor on the device frame. The insulating shield serves not only to directly electrically insulate the motor from the frame, but also serves to block spark jump across the spark gap between the motor and frame.

While this invention is susceptible of embodiment in many different forms, there is shown in the drawing and will hereafter be described in detail a form of the invention with the understanding that the present disclosure is to be considered as an exemplification of the principles of the invention and is not intended to limit the invention to the form illustrated.

BRIEF DESCRIPTION OF THE DRAWINGS

FIG. 1 is a fragmentary plan view of an assembly of an electric motor and drive system on a motor mounting plate module and embodying a form of the insulating system of this invention;

FIG. 2 is an enlarged perspective view of an insulating member of the system of the device of FIG. 1 showing two portions thereof exploded from each other;

FIG. 3 is an enlarged section along line 3—3 in FIG. 1;

FIG. 4 is a bottom plan view of one portion of the insulating member shown in FIG. 2;

FIG. 5 is a partial cross-sectional view of the insulating members in use on a motor with a longer field stack; and FIG. 6 is a view similar to FIG. 5 only showing a still larger motor field stack.

DESCRIPTION OF THE PREFERRED EMBODIMENTS

Referring to the drawings and particularly the assembly of FIG. 1, there is shown a motor mounting frame 10 which includes two plates 12 and 14 stamped in a single operation from a blank of electrically conductive sheet metal as described in the copending application of Anthony Jacyno, entitled "Sheet Metal Frame Module," Ser. No. 850,834, filed Aug. 18, 1969. The disclosure of said application Ser. No. 850,834 is hereby incorporated by reference.

Plates 12 and 14 are secured face to face by suitable bolts, rivets, spot welds, or like means as at 16. The plates 12 and 14 may be mirror images of one another so that when placed in contiguous relation and fastened together the various recesses 18 and openings 20 in the plates will be aligned with one another to provide support for a motor assembly shown generally at 22 and a gear train assembly shown generally at 24. The recesses 18 are mostly semi-spherical struck portions formed during stamping of the plates 12 and 14 and the openings 20 are likewise formed during the stamping operation.

In general, the motor and drive train assemblies are mounted between the frame plates 12 and 14 by bearings received within bearing receivers formed by the recesses 18. The openings 20 accommodate the motor assembly 22 and gear train assembly 24 such as to permit free movement of all moving parts. The gear train assembly 24 drives a shaft 26 which has a tool such as a chuck 28 mounted thereon for rotation therewith.

The motor assembly 22 has a rotor portion including a wound armature 32 on a shaft 34 which is in turn received by mounting bearings adjacent opposing ends of shaft 34 for free rotation of the rotor portion. The stator 30 of the electric motor assembly 22 includes the field magnets of the motor. The stator 30 has a pair of mounting bores 40 and 42 extending longitudinally into a stack of plates of magnetizable iron forming the core on which the field windings (not shown) are wound. The bores 40 and 42 are spaced approximately 180° from each other around the axis of shaft 34 and have their axes radially spaced from the axis of shaft 34. The bores 40 and 42 are axially spaced from pairs of inward facing bore-like or tubular receivers 44, 46 and 48, 50 between the frame plates 12 and 14. Receivers 44 and 46 are axially aligned with each other and with bore 40 while receivers 48 and 50 are axially aligned with each other and with bore 42.

It will be noted in FIG. 1 that opening 20 is shaped to leave a space between stator 30 and the mounting frame 10 including a gap adjacent each pair of receivers 44, 46 and 48, 50. Each of the gaps is filled with a mounting member 52 or 54 which serves to secure the rotor 30 against movement relative to the plate frame 10. As best seen in FIGS. 2 through 4, each mounting member 52 or 54 includes two portions 56 and 58 each having a thick cylindrical section or shielding element 60 much in the form of a longitudinal section of a cylindrical wall of a hollow tube. Mounting portion 56 has an inwardly stepped outer surface at 62 and mounting portion 58 has an outwardly stepped inner surface at 64 such that when the mounting portions 56 and 58 are slid axially toward each other from the position of FIG. 2 to that of FIG. 1, they mate and the shield element 60 is formed as a contiguous element with a stepped joint shown at 70.

Each of mounting member portions 56 and 58 has an inwardly extending integral arm 66 at the end of shield element 60. Each arm 66 has an integral pin 68 which has an inwardly projecting pin element 68a and an outwardly projecting pin element 68b.

To assemble the device as shown in FIG. 1, the pin elements 68a of mounting members 52 and 54 are axially slid into the ends of bores 40 and 42 of stator 30 until properly joined at 70. The motor and gear train assemblies are then laid out on plate 14 with bearings received in appropriate recesses 18 and with pin elements 68b received in appropriate semi-cylindrical recesses which form halves of recesses 44, 46, 48 and 50. Plate 12 is then placed over the assembly in mirror image fashion to complete the recesses 18 which hold the bearings and to complete recesses 44, 46, 48 and 50 which hold pins 68b. The two plates 12 and 14 are then secured face-to-face to each other. The resulting plate frame 10 is then mounted in a suitable casing of electrically conducting metal or electrically non-conducting plastic or a combination of both.

The motor armature windings are supplied with electric current through brushes 72 which are received in suitable insulating receivers 74 which are in turn secured by suitable means to the plate frame 10. If during operation of the device electric current should be transmitted into the field magnet core of stator 30, e.g., by initial faulty insulation or development of faulty insulation in the field windings or even in armature windings 32 during operation, the electrical current will not be transmitted directly to the plate frame 10 because mounting members 52 and 54 are of electrically insulating material which block such transmission. Additionally, each shield portion 60 of electrically insulating mounting members 52 and 54 extends a sufficient distance to both sides of the plate frame 10 to block spark jump across the gap between the magnet core of stator 30 and plate frame 10.

FIGS. 5 and 6 illustrate that the mounting members can be adjusted for use on various size stator or field stack structures. Only one mounting member 152 is shown, but it is understood that two are intended as described with respect to FIG. 1. Specifically, field stacks or stators 130 of different longitudinal length are provided with bores 140 for receiving the inwardly projecting pin elements 168a and 168b on the mounting portions 156 of mounting member 152. As can be seen, the stator 130 of FIG. 5 is longer than the stator 30 of FIG. 1 while in FIG. 6 the stator is longer yet. In both cases of FIGS. 5 and 6 the effect is to spread the overlapping stepped surfaces 162 and 164 but to still maintain a complete insulating barrier or shield between the stator and the metal frame or housing. Within the limits provided by the longitudinal lengths of overlapping stepped surfaces 162 and 164 motors of various longitudinally sized stators are usable with my invention for insulating motors from metal frames or mountings.

I claim:

1. A power tool including an electric motor having a stator member, electrically conductive frame means, insulating shield means positioned between said frame means and the stator of said motor, and mounting means carried by said shield means for securing said motor on said frame, said insulating shield means shielding against spark jump from the motor to the frame means, said insulating shield means comprising a longitudinal tube section shell of insulating material with integral radially inwardly depending arm members, inwardly and outwardly projecting opposing integral pins in axial alignment extending from opposing sides of each arm member on an axis parallel with the axis of said tube section with all of said pins on the same approximate axis, a bore in the stator of said motor parallel to and spaced from the axis of the motor shaft and receiving the inwardly projecting pins of said insulating shield means and receiver means in said frame receiving the outwardly projecting pins of said insulating shield means.

2. The device of claim 1 wherein said frame means comprises first and second stamped sheet metal members of generally planar configuration which are at least in part mirror images of one another and which include means receiving said mounting means between said stamped sheet members for holding said shield means relative to said frame means.

3. A power tool including an electric motor having a stator member, electrically conductive frame means, insulating shield means positioned between said frame means and the stator of said motor, and mounting means carried by said shield means for securing said motor on said frame, said insulating shield means shielding against spark jump from the motor to the frame means, said insulating shield means comprising a pair of shield portions having cooperating joint surfaces for slidably joining said shield portions to provide the shield means, each shield portion including pin means projecting in the direction of joining movement of said shield portions and received by axially sliding movement in pin receivers in said motor during joining movement of said shield portions to form the shield, and including means for locking said shield means to said frame, the frame including abutment means receiving the shield member and locking said shield portion against separation from each other.

4. The device of claim 3 wherein said joint surfaces are cooperating stepped surfaces.

5. The device of claim 3 wherein said shield means has cylindrical inner and outer surfaces.

6. A power tool including an electric motor having a stator member, electrically conductive frame means, insulating shield means positioned between said frame means and the stator of said motor, and mounting means carried by said shield means for securing said motor on said frame, said insulating shield means shielding against spark jump from the motor to the frame means, said shield means comprising two engaged, partially overlapping members longitudinally slidable to accommodate motor stators of different longitudinal lengths, said mounting means being formed of insulating material and integral with said shield means.

7. A power tool including an electric motor having a stator member, electrically conductive frame means, insulating shield means positioned between said frame means and the stator of said motor, and mounting means carried by said shield means for securing said motor on said frame, said insulating shield means shielding against spark jump from the motor to the frame means and being comprised of two engaged, partially overlapping members longitudinally slidable with respect to each other, said mounting means being integral with said overlapping members and comprising insulating pin means located radially inwardly of the outermost peripheral extent of said overlapping members.

* * * * *